US012617083B2

(12) United States Patent (10) Patent No.: US 12,617,083 B2

Morihira et al. (45) Date of Patent: May 5, 2026

(54) MANIPULATION METHOD LEARNING APPARATUS, MANIPULATION METHOD LEARNING SYSTEM, MANIPULATION METHOD LEARNING METHOD, AND PROGRAM

(71) Applicant: HONDA MOTOR CO., LTD., Tokyo (JP)

(72) Inventors: Naoki Morihira, Wako (JP); Akinobu Hayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 18/528,842

(22) Filed: Dec. 5, 2023

(65) Prior Publication Data

US 2024/0286275 A1 Aug. 29, 2024

(30) Foreign Application Priority Data

Feb. 24, 2023 (JP) ................................. 2023-026923

(51) Int. Cl.
B25J 9/16 (2006.01)
(52) U.S. Cl.
CPC ............. B25J 9/163 (2013.01); B25J 9/1605 (2013.01)
(58) Field of Classification Search
CPC ......... B25J 9/163; B25J 9/1605; B25J 9/1612
See application file for complete search history.

(56) References Cited

U.S. PATENT DOCUMENTS

| 11,919,169 | B2 * | 3/2024 | Lee | ........................ G06V 20/50 |
| 2018/0225113 | A1 * | 8/2018 | Hasegawa | ................ B25J 9/163 |
| 2020/0218223 | A1 * | 7/2020 | Reekmans | ............. B25J 9/1671 |
| 2022/0258336 | A1 * | 8/2022 | Okawa | ................... G06N 3/088 |

(Continued)

FOREIGN PATENT DOCUMENTS

| CN | 114161454 | A | * | 3/2022 | .............. B25J 19/02 |
| CN | 119347753 | B | * | 11/2025 | .............. B25J 9/163 |

(Continued)

OTHER PUBLICATIONS

KR-20210069410-A translation (Year: 2021).*

(Continued)

*Primary Examiner* — Kyle T Johnson
(74) *Attorney, Agent, or Firm* — Amin, Turocy & Watson, LLP

(57) ABSTRACT

A manipulation method learning apparatus includes: a storage portion that stores an environment model including a device capable of manipulating a target object; a contact state of the device and the target object acquired by using the environment model as an input and calculates an internal reward from a frequency of occurrence of the contact state; an external reward calculation portion that uses a state quantity of the device acquired by using the environment model, a state quantity of the target object acquired by using the environment model, and a contact state quantity as an input, searches a manipulation strategy of the target object, and calculates an external reward for a target task solution; and a search portion that searches while probabilistically selecting a first strategy updated by using the internal reward and a second strategy updated by using the external reward.

16 Claims, 6 Drawing Sheets

(56)         References Cited

U.S. PATENT DOCUMENTS

| | | | | |
|---|---|---|---|---|
| 2022/0314434 | A1* | 10/2022 | Kranski | B25J 9/163 |
| 2023/0081119 | A1* | 3/2023 | Rohanimanesh | B25J 9/1653 |
| | | | | 700/250 |
| 2023/0234232 | A1* | 7/2023 | Hayashi | B25J 13/084 |
| | | | | 700/253 |
| 2024/0181647 | A1* | 6/2024 | Gildert | B25J 9/1694 |
| 2024/0185083 | A1* | 6/2024 | Hansen | G06N 3/045 |
| 2024/0286275 | A1* | 8/2024 | Morihira | B25J 9/1612 |
| 2024/0289829 | A1* | 8/2024 | Hayashi | G06N 7/01 |
| 2024/0351198 | A1* | 10/2024 | Asatani | B25J 9/163 |

FOREIGN PATENT DOCUMENTS

| | | | | | |
|---|---|---|---|---|---|
| KR | 20210069410 | A | * | 6/2021 | G05B 13/029 |
| WO | WO-2021014226 | A1 | * | 1/2021 | B25J 9/163 |
| WO | WO-2022009859 | A1 | * | 1/2022 | B25J 13/08 |

OTHER PUBLICATIONS

CN-114161454-A translation (Year: 2022).*
WO-2022009859-A1 translation (Year: 2022).*
CN-119347753-B translation (Year: 2025).*
Improved_learning_of_robot_manipulation_tasks_via_tactile_intrinsic_
motivation2021 (Year: 2021).*

\* cited by examiner g201 g211 g221

MANIPULATION METHOD LEARNING APPARATUS, MANIPULATION METHOD LEARNING SYSTEM, MANIPULATION METHOD LEARNING METHOD, AND PROGRAM

CROSS-REFERENCE TO RELATED APPLICATION

Priority is claimed on Japanese Patent Application No. 2023-026923, filed on Feb. 24, 2023, the contents of which are incorporated herein by reference.

BACKGROUND

Field of the Invention

The present invention relates to a manipulation method learning apparatus, a manipulation method learning system, a manipulation method learning method, and a program.

Background

For example, with respect to a manipulation operation such as changing of a holding state of an object by a robot hand having multiple fingers, development has been conducted using an operation plan based on a model designed by human.

Further, development has been conducted for learning a prediction model from data or acquiring a strategy without a model. For example, a method has been proposed in which by attaching a haptic and/or tactile sensor to a wide range of a hand and gripping through trial and error, a GCN (Graph Convolution Networks) model which is a graph structure is learned (for example, refer to Non-Patent Document 1 (Ken Funabashi, Tomoki Isobe, et al., "Realizing manipulation operation of various objects by multifingered robot hand using GCN and distributed tactile sensor", the 40th Annual Conference of the Robotics Society of Japan, RSJ2022, 4B2-03, 2022)). In such a method, a strategy is trained using an external reward which is a reward for solving a given task.

SUMMARY

However, in the related art in which planning is performed using the model designed by human, an applicable manipulation is limited, and due to errors between the model and the real world, robustness at the time of performing is not high. Further, in the technique described in Non-Patent Document 1, when the learning target is a high-dimensional and complex problem, ingenuity such as incorporating a structure that compacts information is required, and when using a tactile sensor, a camera, and a multifingered hand, a highly efficient approach has not been developed yet, and the learning efficiency is poor. Further, in the technique described in Non-Patent Document 1, useful trial and error may not be performed, and learning may not proceed.

An aspect of the present invention aims at providing a manipulation method learning apparatus, a manipulation method learning system, a manipulation method learning method, and a program that can perform efficient trial and error when performing learning of object manipulation.

A manipulation method learning apparatus according to a first aspect of the present invention is a manipulation method learning apparatus that learns a manipulation method of a target object, the manipulation method learning apparatus including: a storage portion that stores an environment model including a device capable of manipulating the target object: a first acquisition portion that acquires a state quantity of the device by using the environment model: a second acquisition portion that acquires a state quantity of the target object by using the environment model: a third acquisition portion that acquires a contact state of the device and the target object by using the environment model: an internal reward calculation portion that uses the contact state as an input and calculates an internal reward from a frequency of occurrence of the contact state; an external reward calculation portion that uses the state quantity of the device, the state quantity of the target object, and a contact state quantity as an input, searches a manipulation strategy of the target object, and calculates an external reward for a target task solution; and a search portion that searches while probabilistically selecting a first strategy which is updated by using the internal reward and a second strategy which is updated by using the external reward.

A second aspect is the manipulation method learning apparatus according to the first aspect described above, wherein the contact state may be at least one of information indicating a position which the device has already touched, a contact state estimated from information of a relative position attitude of the device and the target object, information indicating a position which has already been touched on the target object, information representing a force when the device and the target object are in contact with each other, and a detection value detected by a tactile sensor.

A third aspect is the manipulation method learning apparatus according to the first aspect described above, wherein the search portion may collect, at a time of training, data based on the internal reward in advance and perform training.

A fourth aspect is the manipulation method learning apparatus according to the first aspect described above, wherein the external reward calculation portion may use, as the input, at least one of a position of the target object, an attitude of the target object, information representing a force when the device and the target object are in contact with each other, a detection value detected by a tactile sensor, an action command that has been previously used at a time of training, and a target contact position.

A fifth aspect is the manipulation method learning apparatus according to the first aspect described above, wherein the search portion may probabilistically select either the first strategy or the second strategy for each search and determine an action used for the search.

A sixth aspect is the manipulation method learning apparatus according to the first aspect described above, wherein the device may be a robot hand including two or more finger portions, a haptic sensor may be attached to each fingertip of the robot hand, and a tactile sensor may be attached to each portion of the robot hand.

A seventh aspect is the manipulation method learning apparatus according to the first aspect described above, wherein the internal reward calculation portion may estimate a portion that is possibly in contact based on a relative position attitude between a model of a robot hand and a model of the target object and calculate the internal reward.

A manipulation method learning system according to an eighth aspect of the present invention is a system that learns a manipulation method of a target object, the manipulation method learning system including: a device capable of manipulating the target object: a first acquisition portion that acquires a state quantity of the device; a second acquisition portion that acquires a state quantity of the target object: a third acquisition portion that acquires a contact state of the device and the target object: an internal reward calculation portion that uses the contact state as an input and calculates an internal reward from a frequency of occurrence of the contact state; an external reward calculation portion that uses the state quantity of the device, the state quantity of the target object, and a contact state quantity as an input, searches a manipulation strategy of the target object, and calculates an external reward for a target task solution; and a search portion that searches while probabilistically selecting a first strategy which is updated by using the internal reward and a second strategy which is updated by using the external reward.

A ninth aspect of the present invention is a manipulation method learning method by way of a computer of a manipulation method learning apparatus that learns a manipulation method of a target object, the manipulation method learning method including: acquiring, by using an environment model that includes a device capable of manipulating the target object, a state quantity of the device: acquiring a state quantity of the target object by using the environment model: acquiring a contact state of the device and the target object by using the environment model: using the contact state as an input and calculating an internal reward from a frequency of occurrence of the contact state; using the state quantity of the device, the state quantity of the target object, and a contact state quantity as an input, searching a manipulation strategy of the target object, and calculating an external reward for a target task solution; and searching while probabilistically selecting a first strategy which is updated by using the internal reward and a second strategy which is updated by using the external reward.

A tenth aspect of the present invention is a computer-readable non-transitory recording medium including a manipulation method learning program which causes a computer of a manipulation method learning apparatus that learns a manipulation method of a target object to: acquire, by using an environment model that includes a device capable of manipulating the target object, a state quantity of the device: acquire a state quantity of the target object by using the environment model: acquire a contact state of the device and the target object by using the environment model: use the contact state as an input and calculate an internal reward from a frequency of occurrence of the contact state; use the state quantity of the device, the state quantity of the target object, and a contact state quantity as an input, search a manipulation strategy of the target object, and calculate an external reward for a target task solution; and search while probabilistically selecting a first strategy which is updated by using the internal reward and a second strategy which is updated by using the external reward.

According to the first to tenth aspects described above, it is possible to perform efficient trial and error when performing learning of object manipulation.

DESCRIPTION OF EMBODIMENTS

Figure 1:
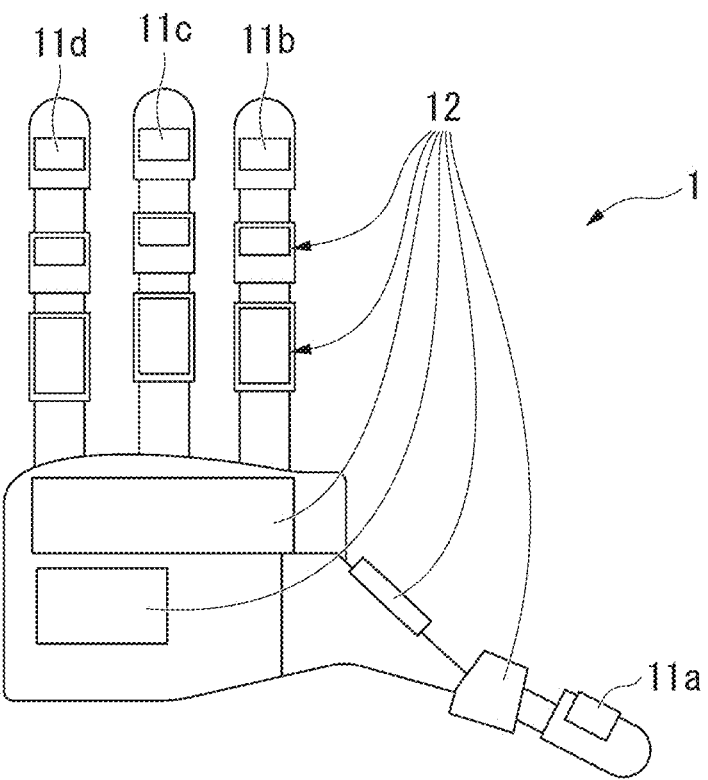
FIG. 1 is a view showing an example of a robot hand including a sensor and including multiple fingers.

Hereinafter, an embodiment of the present invention will be described with reference to the drawings. In the drawings used in the following description, the scale size of each member is appropriately changed such that each member is in a recognizable size.

In all of the drawings for describing the embodiment, the same reference numerals are used for components having the same function, and repetitive description is omitted.

Further, the term "based on XX" in the present application means "based on at least XX" and also includes the case based on another element in addition to XX. Further, the term "based on XX" is not limited to the case in which XX is directly used but also includes the case based on an element obtained by performing calculation or processing to XX. "XX" is an arbitrary element (for example, any information).

(Robot Hand Including Sensor)

First, an example of a robot hand including a sensor and including multiple fingers is described.

FIG. 1 is a view showing an example of a robot hand including a sensor and including multiple fingers. In FIG. 1, an example is shown in which the number of fingers is four; however, the number of fingers is not limited thereto. For example, the number of fingers may be two or three. The number of fingers may be five or more.

A haptic sensor 11 (11$a$, 11$b$, 11$c$, 11$d$) which is a six-axis sensor is attached to each fingertip.

Further, a tactile sensor 12 is attached to the ball of a finger, the palm of the hand, and the like.

The attached position, the number, the size, and the like of the sensor shown in FIG. 1 are examples and are not limited thereto.

(Configuration Example of Manipulation Method Learning System)

Next, a configuration example of a manipulation method learning system is described.

Figure 2:
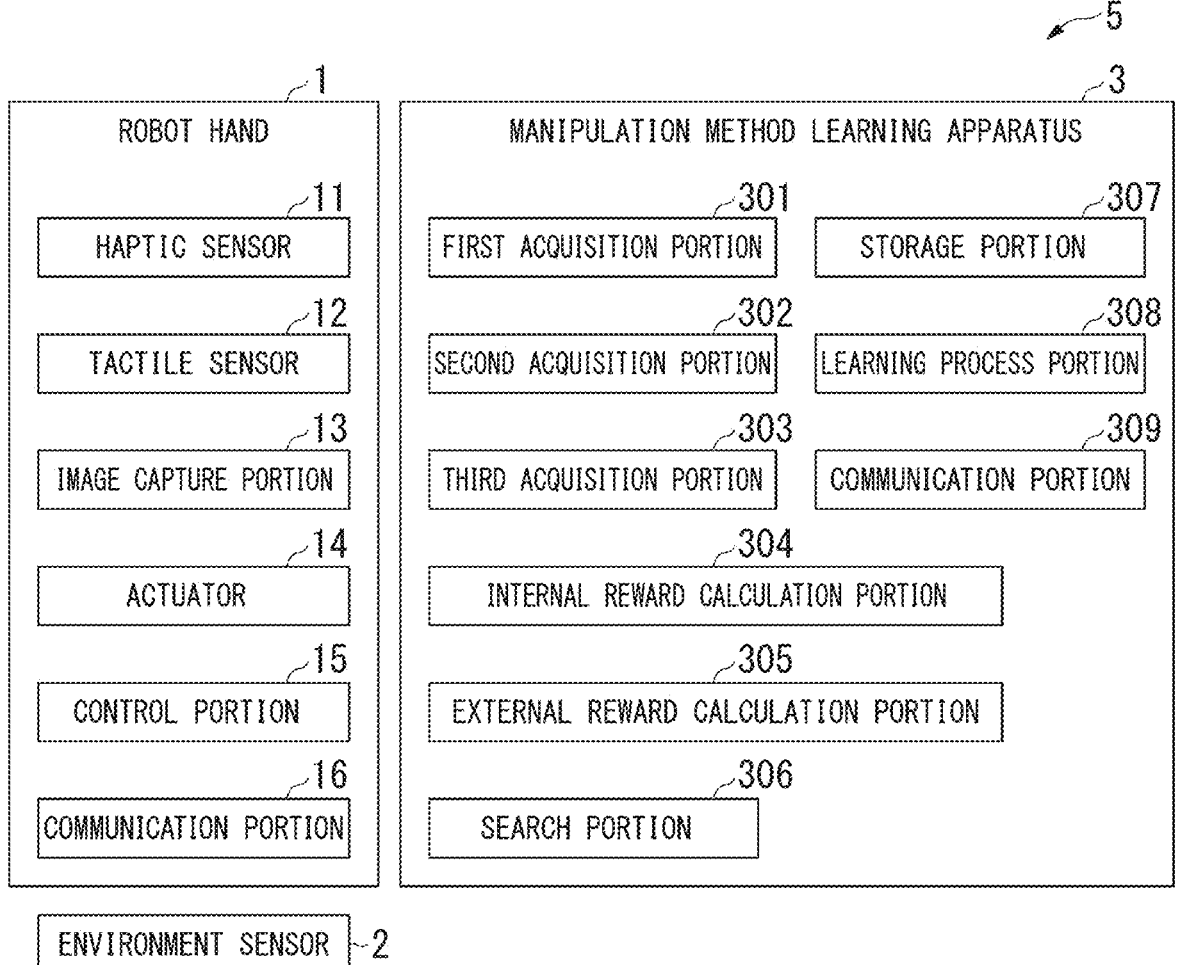
FIG. 2 is a view showing a configuration example of a manipulation method learning system according to an embodiment.

FIG. 2 is a view showing a configuration example of a manipulation method learning system according to the present embodiment. As shown in FIG. 2, a manipulation method learning system 5 includes a robot hand 1, an environment sensor 2, and a manipulation method learning apparatus 3.

The robot hand 1 includes, for example, a haptic sensor 11, a tactile sensor 12, an image capture portion 13, an actuator 14, a control portion 15, and a communication portion 16.

The manipulation method learning apparatus 3 includes, for example, a first acquisition portion 301, a second acquisition portion 302, a third acquisition portion 303, an internal reward calculation portion 304, an external reward calculation portion 305, a search portion 306, a storage portion 307, a learning process portion 308, and a communication portion 309.

The robot hand 1 and the manipulation method learning apparatus 3 are connected to each other in a wired or wireless manner. Further, the environment sensor 2 and the manipulation method learning apparatus 3 are connected to each other in a wired or wireless manner.

The robot hand 1 is, for example, a multifingered hand including four fingers as shown in FIG. 1. The robot hand 1 is connected to an arm (not shown). In the present embodiment, work performed by the robot hand 1 is to try a variety of holding ways including, for example, gripping a target object, changing a holding state such as changing the attitude of the object or moving the object after gripping the target object, and the like.

The environment sensor 2 is, for example, an RGB (red, green, blue) D imaging device that can also measure depth information D. The environment sensor 2 is arranged, for example, in a range in which an object or the robot hand 1 can be imaged. A plurality of environment sensors 2 may be provided.

The haptic sensor 11 is, for example, a six-axis haptic sensor (6AF sensor) that can measure the magnitude of a force or a torque acting in a plurality of directions in real time.

The tactile sensor 12 is, for example, a tactile sensor that detects information perceived by the sense of touch included in a human hand or the like and converts the information into an electric signal.

The image capture portion 13 is attached, for example, to the back of the hand or the like. The image capture portion 13 is an RGB (red, green, blue) D imaging device that can also measure depth information D.

The actuator 14 drives each joint of the robot hand 1 in accordance with the control of the control portion 15.

The control portion 15 transmits a detection value detected by each sensor and an image captured by the image capture portion 13 to the manipulation method learning apparatus 3 via the communication portion 16. The control portion 15 acquires the information transmitted by the manipulation method learning apparatus 3 via the communication portion 16.

The communication portion 16 transmits the information output by the control portion 15 to the manipulation method learning apparatus 3. The communication portion 16 receives the information transmitted by the manipulation method learning apparatus 3 and outputs the received information to the control portion 15.

For example, the first acquisition portion 301 acquires a detection value of the haptic sensor 11 as a state quantity (a joint angle of the hand or the like) of the device.

For example, the second acquisition portion 302 acquires an image (including the depth information) captured by the image capture portion 13 and an image (including the depth information) captured by the environment sensor 2, performs image processing on the information included in the acquired image, and acquires a state quantity (a position attitude of the target object or the like) of a manipulation target object.

For example, the third acquisition portion 303 acquires a detection value of the tactile sensor 12 and acquires a contact state of the device and the target object by using the acquired detection value. The contact state is at least one of information indicating a position which the robot hand 1 (device) that manipulates the target object has already touched, a contact state estimated from information of a relative position attitude of the robot hand 1 and the target object, information indicating a position which has already been touched on the target object, information representing a force when the robot hand 1 and the target object are in contact with each other, and a detection value detected by a tactile sensor. Even when the robot hand 1 does not include a contact sensor, since even a contact state that can be estimated from a position relationship between the robot hand 1 and a shape model of the target object can be used for calculation of an internal reward, "a contact state estimated from information of a relative position attitude of the robot hand 1 and the target object" is also the contact state.

The internal reward calculation portion 304 uses a contact state quantity as an input and calculates an internal reward from a frequency of occurrence of the contact state. The following embodiment is described using an example in which the internal reward calculation portion 304 uses RND (Random Network Dispersion); however, another method may be used. RND will be discussed later.

The external reward calculation portion 305 calculates an external reward for a target task solution.

At the time of training, the search portion 306 updates a first strategy by using an internal reward and updates a second strategy by using an external reward. The search portion 306 probabilistically selects one from two strategies which are the first strategy and the second strategy at the time of searching and determines an action including the state quantity used for the search.

The storage portion 307 stores the frequency of occurrence of the contact state. The storage portion 307 stores, for example, a parameter of a kernel function, a parameter of the RND, and the like. The storage portion 307 stores an environment model, the external reward, the internal reward, the first strategy, the second strategy, a previous command, a target contact position, and the like.

The storage portion 307 stores a parameter of an environment model or a function approximation unit used in a training algorithm. The environment model includes, for example, a model of the robot hand 1, a model of a manipulation target, and the like.

The learning process portion 308 uses, as an input to the model, a device state quantity, a target object state quantity, and a contact state quantity that are acquired. At the time of training, the learning process portion 308 initializes the kernel function and the model that are stored by the storage portion 307, the first strategy for training with the internal reward, and the second strategy for training with the external reward. The learning process portion 308 probabilistically selects a strategy, generates an action command, and transmits the generated action command to the robot hand 1 via the communication portion 309.

For example, the communication portion 309 transmits an action command to the robot hand 1 in accordance with the command of the learning process portion 308.

(Approach of Reinforcement Learning)

Next, an example of an approach of reinforcement learning is described.

In the machine learning of the present embodiment, an approach is performed in which the internal reward and the external reward are used for the search and the trial and error while simultaneously considering the internal reward and the external reward. The internal reward is a reward independent of a task and is, for example, rarity of a state, confidence with respect to a state, uncertainty, or the like. The external reward is a reward for solving a given task.

The internal reward is calculated, for example, by using a neural network, a kernel method, or the like. The methods used for the calculation of the internal reward include, for example, a method (for example, refer to Reference Document 1 (Yuri Burda, et al., "EXPLORATION BY RANDOM NETWORK DISTILLATION", arXiv: 1810.12894, 2018) (RND)) in which the parameter of a network of a training target is trained such that an output difference between a neural network of a target in which the parameter is randomly initialized and fixed and a neural network of the training target becomes small. In this method, when the trained data is input, the two networks output similar values, and when unknown data is input, the two networks output different values. In general, the input used for the internal reward is all states, but in the present embodiment, some information of all states is used.

Figure 3:
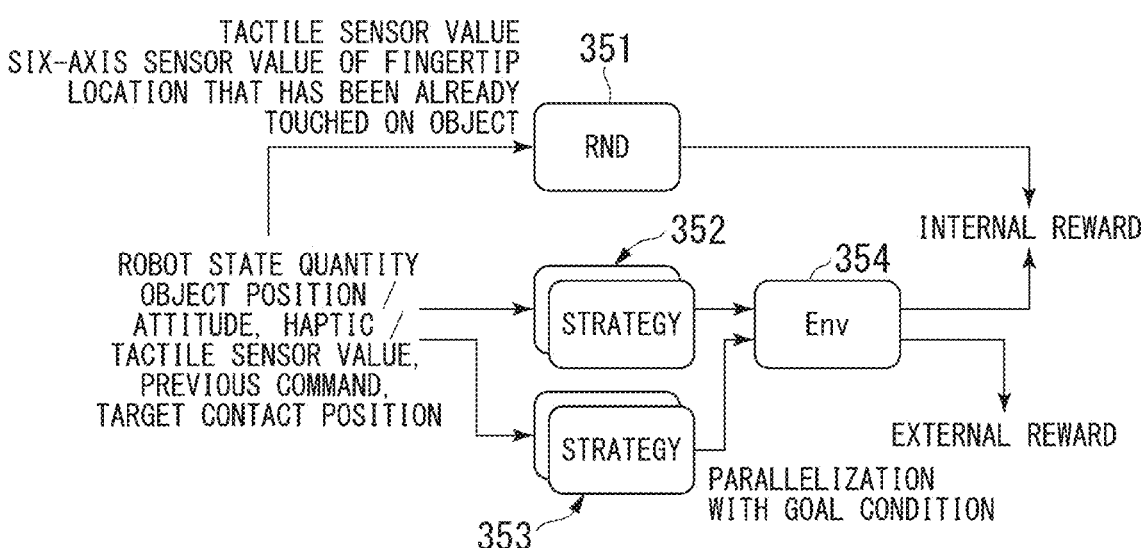
FIG. 3 is a view showing an outline of a process at the time of training of a manipulation method according to the embodiment.

FIG. 3 is a view showing an outline of a process at the time of training of a manipulation method according to the present embodiment.

In the present embodiment, by trying various contact states even when the task is changed, that is, searching unfamiliar contact states and by facilitating useful trial and error, learning of strategies is performed. In the present embodiment, the internal reward is calculated by a RND 351 by using part of the state quantity, a first strategy 352 is updated by training with the internal reward, and a second strategy 353 is updated by training with the external reward.

The manipulation method learning apparatus 3 inputs at least one of a detection value of the haptic sensor 11, a detection value of the tactile sensor 12, and information indicating a position that has already been touched by the finger on the target object based on the detection value of the sensor and the image captured by the image capture portion 13 or the environment sensor 2 among the information acquired from the robot hand 1 and the environment sensor 2 to the RND 351 and calculates the internal reward relating to the contact state. The network of the RND 351 calculates the internal reward by using the method of Reference Document 1 described above. The calculation of the internal reward may be performed by the kernel method or the like. The RND 351 outputs the internal reward when a contact state is input. For example, when an action at is taken in a state $s_t$, only the contact state of the next state $s_{t+1}$ that is output by an environment 354 (Env) is input to the RND 351, and the RND 351 calculates the internal reward.

The first strategy 352 is a strategy considering only the internal reward. The first strategy 352 is trained and updated by the internal reward. Information of the acquired state quantity (a joint angle or the like) of the robot, an object position and attitude, a detection value of the haptic sensor 11, a detection value of the tactile sensor 12, a command performed previously, a target contact position, or the like is input to the first strategy 352. The output of the first strategy 352 is an action.

The second strategy 353 is a strategy considering only the external reward. The second strategy 353 is trained and updated by the external reward. Information of the acquired state quantity (a joint angle or the like) of the robot, an object position and attitude, a detection value of the haptic sensor 11, a detection value of the tactile sensor 12, a command performed previously, a target contact position, or the like is input to the second strategy 353. The command performed previously is stored by the storage portion 307. Further, the target contact position is generated, for example, by the learning process portion 308. The output of the second strategy 353 is an action. The calculation of the external reward differs depending on a set task. For example, in the case of a task that changes the position of an object, the external reward is calculated only from some information (the position of the object) of the state quantity. Further, in the case of another task, the external reward is calculated from all information of the state quantity.

The number of each strategy is not limited to one. For example, when there are a plurality of goals, a strategy may be provided for each goal. Alternatively, a plurality of goals may be used and input to one strategy. That is, the strategy may be parallelized or may be used with a goal condition.

The external reward can be stored, and the value of the external reward can be used as is at the time of training. In the case of an on-policy, the internal reward is also temporarily stored, and the value of the internal reward is used as is at the time of training but is discarded after the training. It is determined whether or not the internal reward in the case of an off-policy is rare in consideration of the data experienced so far. Therefore, after the number of data is increased, recalculation is required.

Then, in the training using the external reward, a state $s_t$, an action $a_t$, an external reward $r^{\wedge Ext}$, and a state $s_{t+1}$ after the action are taken out from the storage portion 307 for a plurality of t, and the parameter of a strategy network is updated based on these values.

In the training using the internal reward, a state $s_t$, an action $a_t$, and a state $s_{t+1}$ after the action are taken out from the storage portion 307 for a plurality of t, an internal reward $r^{\wedge Int}$ is recalculated with respect to $s_{t+1}$, and the parameter of a strategy network is updated based on these values.

The environment 354 (Env) probabilistically selects the outputs of the first strategy 352 and the second strategy 353 and performs the action output by the strategy by an environment model. The probability of selection is, for example, 40% for the first strategy 352 and 60% for the second strategy 353. The output of the environment 354 (Env) is only the external reward calculated based on the state quantity, object information, and contact information of the robot.

For example, when the state $s_t$ and the action at are input, the environment 354 (Env) outputs the next state $s_{t+1}$ and the external reward $r^{\wedge Ext}$. When the action output by the first strategy 352 is input or when the action output by the second strategy 353 is input, the environment 354 (Env) outputs the next state $s_{t+1}$ and the external reward $r^{\wedge Ext}$. Further, when the scales output by the first strategy 352 and the second strategy 353 are different from each other, for example, normalization is performed such that the scale ranges become the same. The stored information is the state $s_t$, the action at, the external reward $r^{\wedge Ext}$, and the next state $s_{t+1}$. Further, the internal reward $r^{\wedge Int}$ is recalculated at the time of training.

In this way, the environment 354 (Env) corresponds to the external reward calculation portion 305 that calculates the external reward. Further, the RND 351 corresponds to the internal reward calculation portion 304 that calculates the internal reward.

(Learning Procedure of Manipulation Method Learning Apparatus)

Next, an example of a process procedure of a manipulation method learning apparatus is described.

Figure 4:
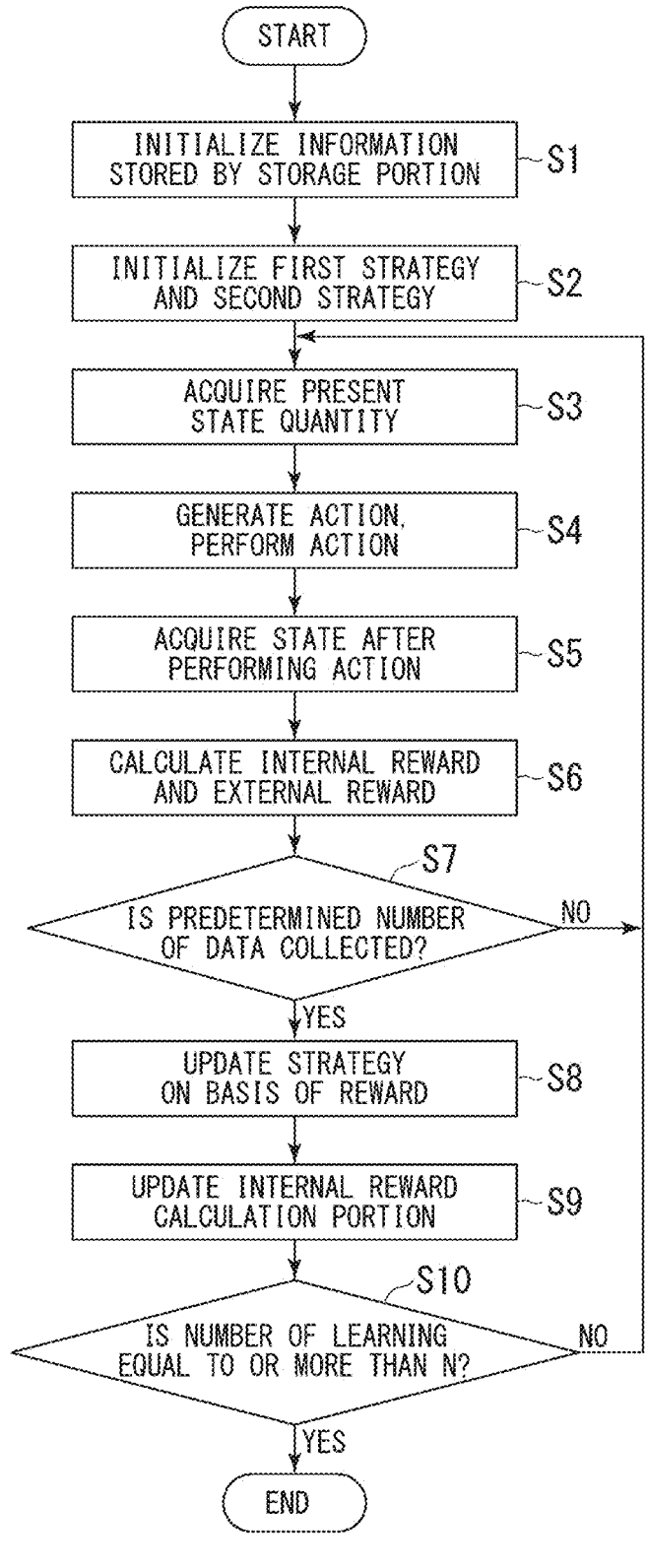
FIG. 4 is a flowchart showing a learning procedure of a manipulation method learning apparatus according to the embodiment.

FIG. 4 is a flowchart showing a learning procedure of a manipulation method learning apparatus according to the present embodiment.

The process of FIG. 4 is an example of the case of an on-policy. The on-policy is a process that accumulates data and does not reuse the data for the update of the policy.

(Step S1) The learning process portion 308 initializes the frequency of occurrence of the contact state stored by the storage portion 307, that is, the parameter of the RND or the like. The contact state includes, for example, information such as a contact state between a target object and a finger portion or a position of a target object touched by a finger portion.

(Step S2) The learning process portion 308 initializes (set to a predetermined value or the like) parameters of networks of the first strategy and the second strategy.

(Step S3) The first acquisition portion 301 to the third acquisition portion 303 acquire a present state quantity (the position of the target object, the attitude of the target object, the detection value of the haptic sensor, the detection value of the tactile sensor, the previous command, and the target contact position) including a present contact state.

(Step S4) The internal reward calculation portion 304 obtains the frequency of occurrence of the contact state and calculates the internal reward. That is, the internal reward calculation portion 304 calculates the internal reward by using some of the state quantity relating to the contact state and by using the RND. Further, the external reward calculation portion 305 calculates the external reward by using all or some of the state quantity depending on the task. The learning process portion 308 probabilistically selects the first strategy and the second strategy and generates an action. The learning process portion 308 performs the generated action by the environment model. The learning process portion 308 may transmit an action command to the robot hand 1 via the communication portion 309 such that the generated action is performed by the robot hand 1. In this case, the robot hand 1 may perform one step of the action in accordance with the action command.

(Step S5) The first acquisition portion 301 to the third acquisition portion 303 acquire the state quantity after the action is performed.

(Step S6) The internal reward calculation portion 304 calculates the internal reward by using some of the state quantity relating to the contact state after the acquired action is performed. The external reward calculation portion 305 calculates the external reward by using all or some of the state quantity after the acquired action is performed.

(Step S7) The learning process portion 308 determines whether or not a predetermined number of data (state quantity) is collected. The learning process portion 308 proceeds to the process of Step S8 when the predetermined number of data is collected (Step S7: YES). The learning process portion 308 returns to the process of Step S3 when the predetermined number of data is not collected (Step S7; NO).

(Step S8) The search portion 306 updates the first strategy on the basis of the internal reward calculated in Step S7. The search portion 306 updates the second strategy on the basis of the external reward calculated in Step S7.

(Step S9) The internal reward calculation portion 304 updates the internal reward calculation portion 304, for example, updates the network of the RND on the basis of the updated first strategy.

(Step S10) The learning process portion 308 determines whether or not the learning is completed. The learning process portion 308 determines that the learning is completed, for example, when a predetermined number of actions or learnings is performed. The learning process portion 308 completes the learning process when the learning is completed (Step S10: YES). The learning process portion 308 causes the process to return to Step S3 when the learning is not completed (Step S10; NO).

The process procedure shown in FIG. 4 is an example and is not limited thereto. For example, the processes of Steps S1 and S2 may be performed in parallel, or the process order may be reversed.

(Evaluation Result)

Next, an example of an evaluation result is described.

Figure 5:
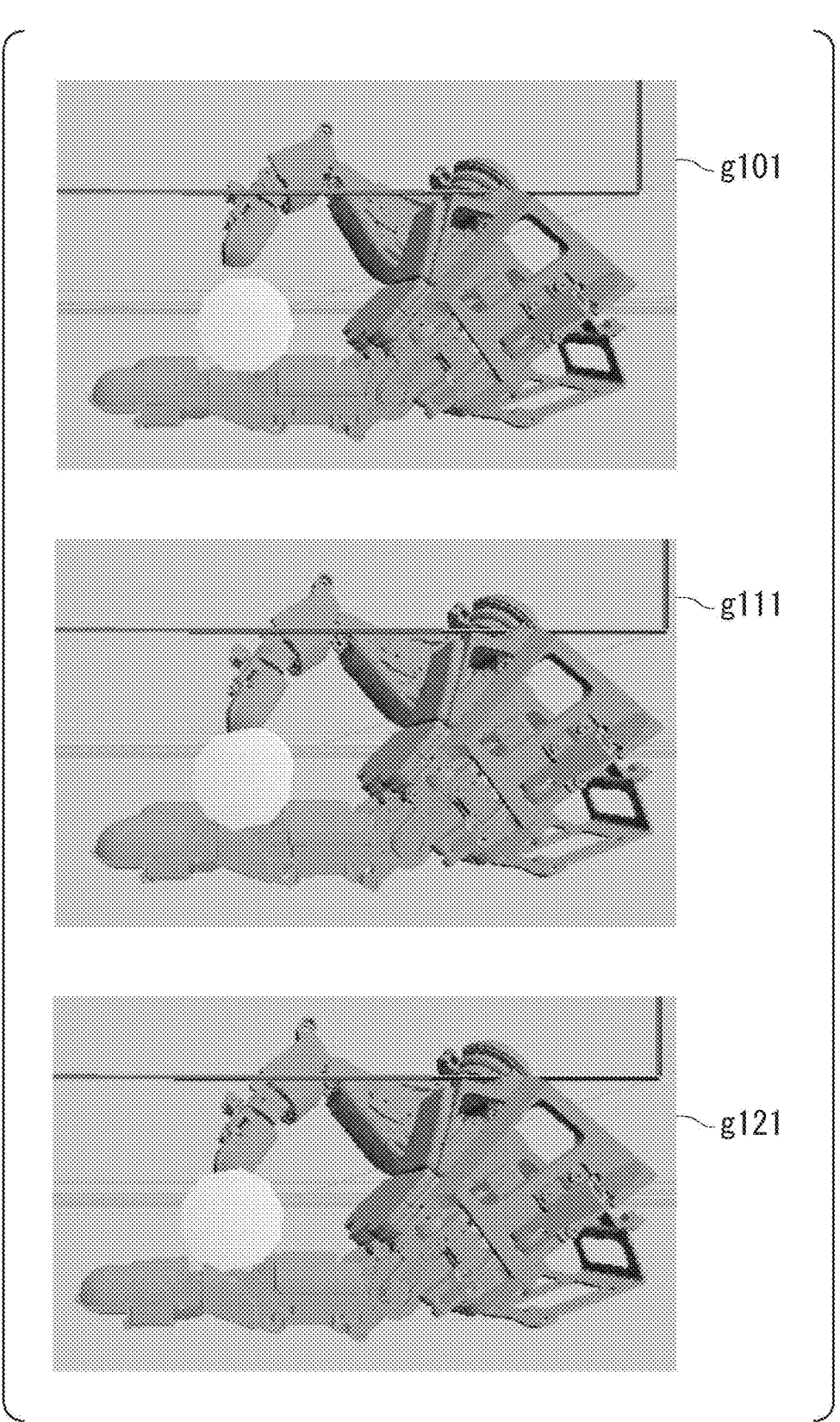
FIG. 5 is a view showing an example of search of a contact state by a policy based on an external reward without an internal reward calculation portion of a comparison example.
Figure 6:
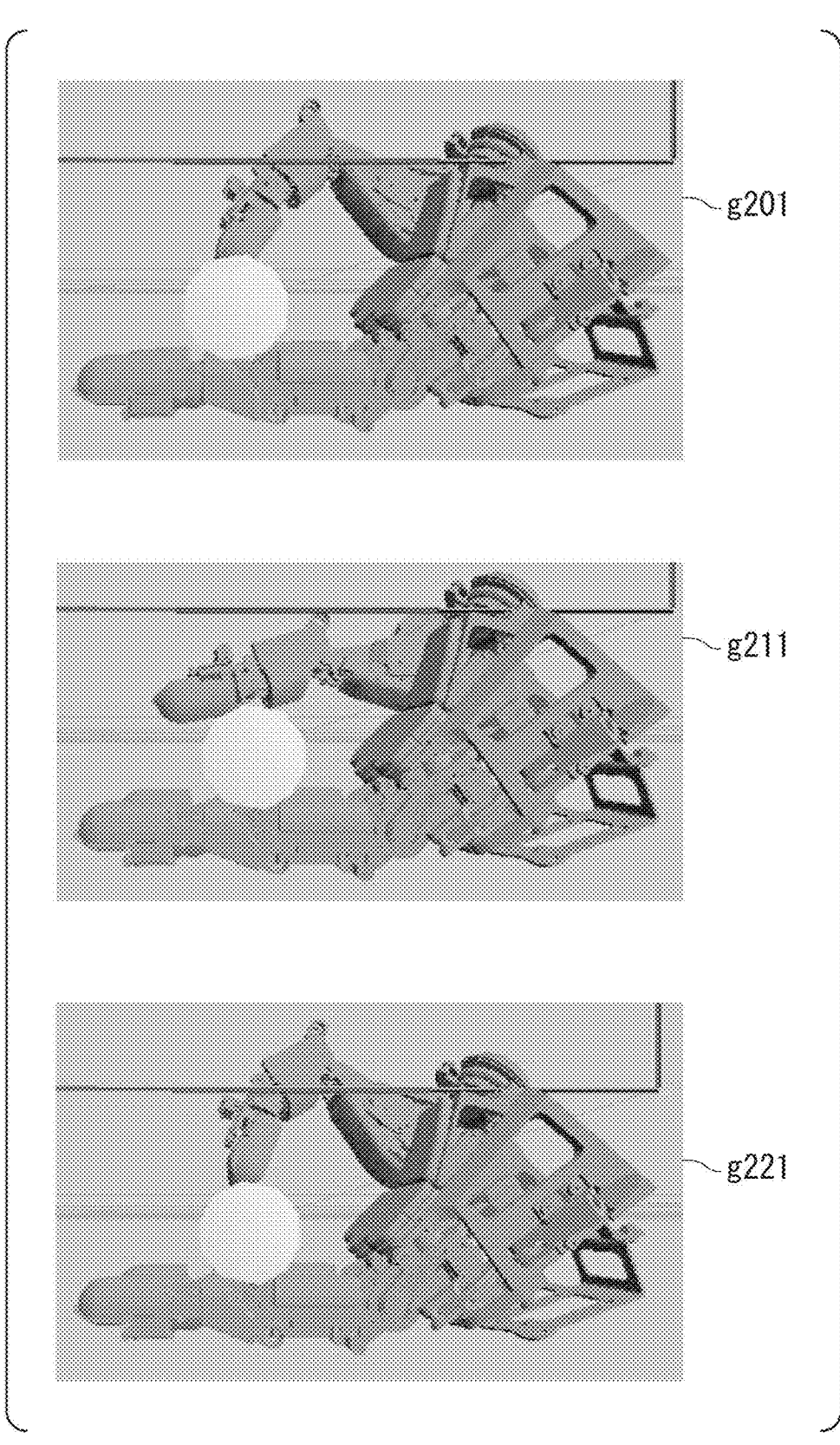
FIG. 6 is a view showing an example of search of a contact state by a policy using an internal reward with an internal reward calculation portion according to the embodiment.
Figure 7:
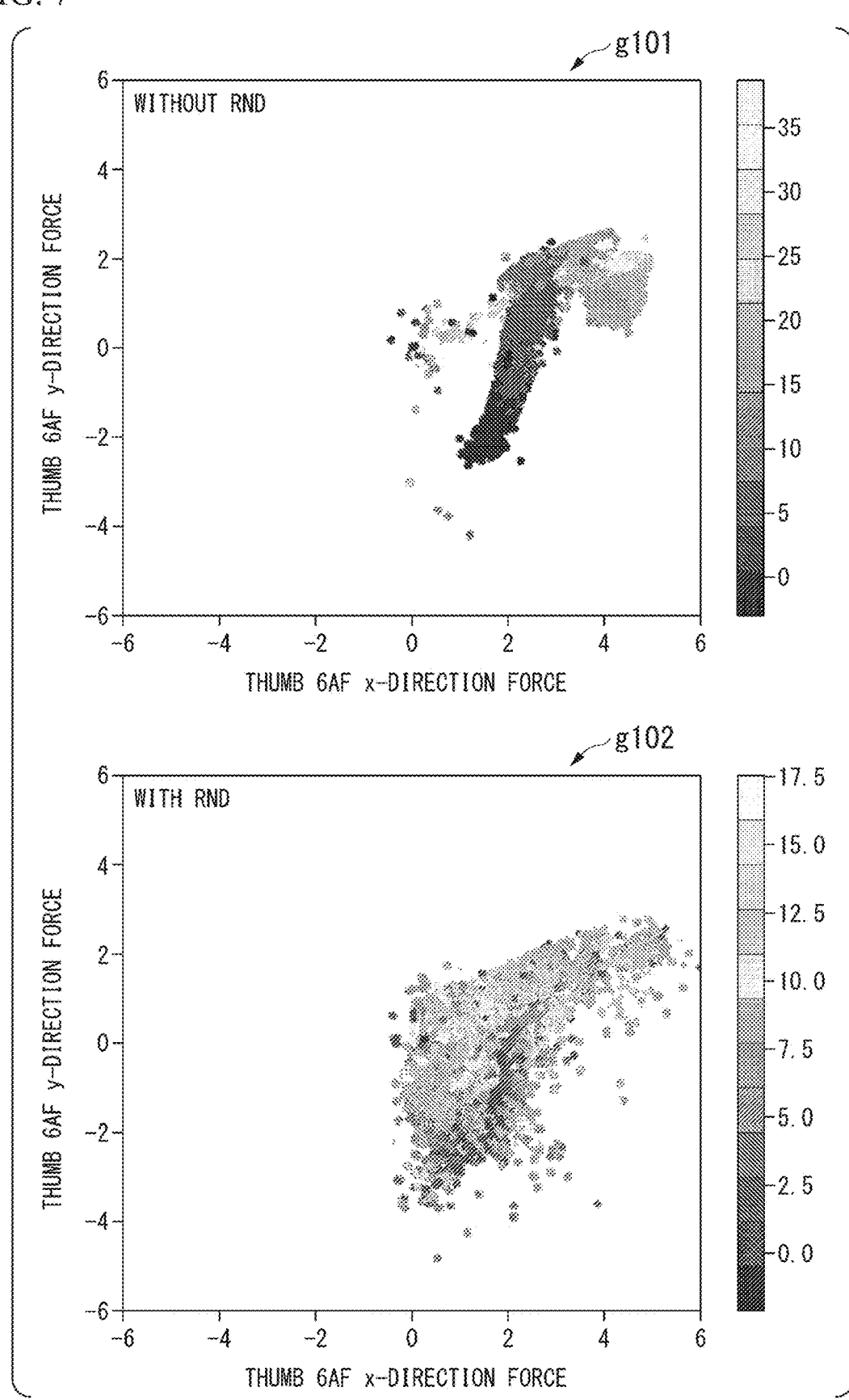
FIG. 7 is a view showing examples of search ranges in the comparison example and the embodiment.

FIG. 5 is a view showing an example of search of a contact state by a policy based on an external reward without an internal reward calculation portion of a comparison example. FIG. 6 is a view showing an example of search of a contact state by a policy using an internal reward with the internal reward calculation portion according to the present embodiment. FIG. 7 is a view showing examples of search ranges in the comparison example and the present embodiment. Reference numeral g101 of FIG. 6 and reference numeral g201 of FIG. 7 represent operation examples in which the number of trainings is about five. Reference numeral g111 of FIG. 6 and reference numeral g211 of FIG. 7 represent operation examples in which the number of trainings is about ten. Reference numeral g121 of FIG. 6 and reference numeral g221 of FIG. 7 represent operation examples in which the number of trainings is about thirty. In FIG. 7, the graph of reference numeral g101 is a result of the comparison example, and the graph of reference numeral g102 is a result of the present embodiment. Further, in FIG. 7, the horizontal axis represents a force (N (Newton)) in the x-direction by the six-axis haptic sensor 11 attached to the thumb of the robot hand 1, and the vertical axis represents a force (N) in the y-direction by the six-axis haptic sensor 11 attached to the thumb of the robot hand 1.

As shown in FIG. 5 to FIG. 7, in the present embodiment, since the internal reward is used, it is possible to search the contact state of a wider range faster than the comparison example using only the external reward.

As described above, according to the present embodiment, in parallel with the trial and error for solving a target task, a search that prefers a rare contact state is facilitated, and therefore, efficient trial and error is performed when performing the manipulation learning of a target object by the robot hand 1 including multiple fingers. Further, according to the present embodiment, since an efficient search is induced independently of ingenuity such as incorporating a structure that compacts multidimensional information as in the related art, model acquisition is not required, and it is possible to assist model-free learning of strategy acquisition. The model used by the manipulation method learning apparatus 3 of the present embodiment is a model relating to a device such as the robot hand 1 and a model (the shape, the size, the weight, and the like) relating to the target object and is different from the model used for the learning of the strategy or the like.

All or some of the processes performed by the manipulation method learning apparatus 3 may be performed by recording a program realizing all or some of the functions of the manipulation method learning apparatus 3 in the embodiment of the present invention on a computer-readable recording medium and causing a computer system to read and execute the program recorded on the recording medium. The "computer system" mentioned here is assumed to include an OS or hardware such as peripheral devices. The "computer system" is assumed to also include a WWW system including a home page-providing environment (or a display environment). The "computer-readable recording medium" is a portable medium such as a flexible disc, a magneto-optical disc, a ROM, or a CD-ROM or a storage device such as a hard disk contained in the computer system. Further, the "computer-readable recording medium" is assumed to include a medium that retains a program for a given time, such as a volatile memory (RAM) in a computer system serving as a server or a client when a program is transmitted via a network such as the Internet or a communication circuit such as a telephone circuit.

The program may be transmitted from a computer system that stores the program in a storage device or the like to another computer system via a transmission medium or by transmission waves in a transmission medium. Here, the "transmission medium" transmitting the program is a medium that has a function of transmitting information, such as a network (communication network) such as the Internet or a communication circuit (communication line) such as a telephone circuit. The program may be a program realizing some of the functions described above. Further, the program may be a program in which the functions described above can be realized in combination with a program which has already been recorded in a computer system, that is, a so-called a differential file (differential program).

While an embodiment of the present invention has been described, the present invention is not limited to such an embodiment, and various modifications and substitutions can be made without departing from the scope of the present invention.

What is claimed is:

1. A manipulation method learning apparatus that learns a manipulation method of a target object, the manipulation method learning apparatus comprising:

a memory that stores an environment model including a device capable of manipulating the target object; and a processor that is coupled to the memory and functions as:

a first acquisition portion that acquires a state quantity of the device by using the environment model;

a second acquisition portion that acquires a state quantity of the target object by using the environment model;

a third acquisition portion that acquires a contact state of the device and the target object by using the environment model;

an internal reward calculation portion that uses the contact state as an input and calculates an internal reward which is a reward independent of a target task from a frequency of occurrence of the contact state;

an external reward calculation portion that uses the state quantity of the device, the state quantity of the target object, and a contact state quantity of the contact state as an input, searches a manipulation strategy of the target object, and calculates an external reward for a target task solution which is a reward for solving the target task; and a search portion that searches in consideration of the internal reward and the external reward simultaneously while probabilistically selecting a first strategy which is updated by using the internal reward and a second strategy which is updated by using the external reward.

2. The manipulation method learning apparatus according to claim 1, wherein the contact state is at least one of information indicating a position which the device has already touched, a contact state estimated from information of a relative position attitude of the device and the target object, information indicating a position which has already been touched on the target object, information representing a force when the device and the target object are in contact with each other, and a detection value detected by a tactile sensor.

3. The manipulation method learning apparatus according to claim 2, wherein the search portion collects, at a time of training, data based on the internal reward in advance and performs training.

4. The manipulation method learning apparatus according to claim 2, wherein the external reward calculation portion uses, as the input, at least one of a position of the target object, an attitude of the target object, information representing a force when the device and the target object are in contact with each other, a detection value detected by a tactile sensor, an action command that has been previously used at a time of training, and a target contact position.

5. The manipulation method learning apparatus according to claim 2, wherein the search portion stores the internal reward, the external reward, an action command to the device, and an action of the device for each search, and updates the first strategy and the second strategy for each predetermined number of the action.

6. The manipulation method learning apparatus according to claim 2, wherein the device is a robot hand including two or more finger portions, a haptic sensor is attached to each fingertip of the robot hand, and a tactile sensor is attached to each portion of the robot hand.

7. The manipulation method learning apparatus according to claim 2, wherein the internal reward calculation portion estimates a portion that is possibly in contact based on a relative position attitude between a model of a robot hand and a model of the target object and calculates the internal reward.

8. The manipulation method learning apparatus according to claim 1, wherein the search portion collects, at a time of training, data based on the internal reward in advance and performs training.

9. The manipulation method learning apparatus according to claim 1, wherein the external reward calculation portion uses, as the input, at least one of a position of the target object, an attitude of the target object, information representing a force when the device and the target object are in contact with each other, a detection value detected by a tactile sensor, an action command that has been previously used at a time of training, and a target contact position.

10. The manipulation method learning apparatus according to claim 1, wherein the search portion stores the internal reward, the external reward, an action command to the device, and an action of the device for each search, and updates the first strategy and the second strategy for each predetermined number of the action.

11. The manipulation method learning apparatus according to claim 1, wherein the device is a robot hand including two or more finger portions, a haptic sensor is attached to each fingertip of the robot hand, and a tactile sensor is attached to each portion of the robot hand.

12. The manipulation method learning apparatus according to claim 1, wherein the internal reward calculation portion estimates a portion that is possibly in contact based on a relative position attitude between a model of a robot hand and a model of the target object and calculates the internal reward.

13. The manipulation method learning apparatus according to claim 1, wherein the search portion facilitates a search that prefers a rare contact state.

14. A manipulation method learning system that learns a manipulation method of a target object, the manipulation method learning system comprising:

a device capable of manipulating the target object; and a processor that functions as:

a first acquisition portion that acquires a state quantity of the device;

a second acquisition portion that acquires a state quantity of the target object;

a third acquisition portion that acquires a contact state of the device and the target object;

an internal reward calculation portion that uses the contact state as an input and calculates an internal reward which is a reward independent of a target task from a frequency of occurrence of the contact state;

an external reward calculation portion that uses the state quantity of the device, the state quantity of the target object, and a contact state quantity of the contact state as an input, searches a manipulation strategy of the target object, and calculates an external reward for a target task solution which is a reward for solving the target task; and a search portion that searches in consideration of the internal reward and the external reward simultaneously while probabilistically selecting a first strategy which is updated by using the internal reward and a second strategy which is updated by using the external reward.

15. A manipulation method learning method by way of a computer of a manipulation method learning apparatus that learns a manipulation method of a target object, the manipulation method learning method including:

acquiring, by using an environment model that includes a device capable of manipulating the target object, a state quantity of the device;

acquiring a state quantity of the target object by using the environment model;

acquiring a contact state of the device and the target object by using the environment model;

using the contact state as an input and calculating an internal reward which is a reward independent of a target task from a frequency of occurrence of the contact state;

using the state quantity of the device, the state quantity of the target object, and a contact state quantity of the contact state as an input, searching a manipulation strategy of the target object, and calculating an external reward for a target task solution which is a reward for solving the target task; and searching in consideration of the internal reward and the external reward simultaneously while probabilistically selecting a first strategy which is updated by using the internal reward and a second strategy which is updated by using the external reward.

16. A computer-readable non-transitory recording medium including a program which causes a computer of a manipulation method learning apparatus that learns a manipulation method of a target object to:

acquire, by using an environment model that includes a device capable of manipulating the target object, a state quantity of the device;

acquire a state quantity of the target object by using the environment model;

acquire a contact state of the device and the target object by using the environment model;

use the contact state as an input and calculate an internal reward which is a reward independent of a target task from a frequency of occurrence of the contact state;

use the state quantity of the device, the state quantity of the target object, and a contact state quantity of the contact state as an input, search a manipulation strategy of the target object, and calculate an external reward for a target task solution which is a reward for solving the target task; and search in consideration of the internal reward and the external reward simultaneously while probabilistically selecting a first strategy which is updated by using the internal reward and a second strategy which is updated by using the external reward.

* * * * *